United States Patent
Kozu et al.

(10) Patent No.: US 9,496,069 B2
(45) Date of Patent: Nov. 15, 2016

(54) SILVER NANOPARTICLES, METHOD FOR PRODUCING SAME, SILVER NANOPARTICLE DISPERSION LIQUID, AND BASE PROVIDED WITH SILVER MATERIAL

(71) Applicant: NOF CORPORATION, Tokyo (JP)

(72) Inventors: Tatsuya Kozu, Tsukuba (JP); Masaya Hikita, Tsukuba (JP); Eui-chul Kang, Tsukuba (JP)

(73) Assignee: NOF CORPORATION, Tokyo (JP)

( * ) Notice: Subject to any disclaimer, the term of this patent is extended or adjusted under 35 U.S.C. 154(b) by 142 days.

(21) Appl. No.: 14/415,216

(22) PCT Filed: May 29, 2013

(86) PCT No.: PCT/JP2013/064946
§ 371 (c)(1),
(2) Date: Jan. 16, 2015

(87) PCT Pub. No.: WO2014/013794
PCT Pub. Date: Jan. 23, 2014

(65) Prior Publication Data
US 2015/0206618 A1    Jul. 23, 2015

(30) Foreign Application Priority Data

Jul. 19, 2012 (JP) .................................. 2012-160566

(51) Int. Cl.
| | |
|---|---|
| *H01B 1/02* | (2006.01) |
| *C09D 11/52* | (2014.01) |
| *C22C 5/06* | (2006.01) |
| *B82Y 30/00* | (2011.01) |
| *B82Y 40/00* | (2011.01) |
| *B22F 1/00* | (2006.01) |
| *H01B 1/22* | (2006.01) |

(Continued)

(52) U.S. Cl.
CPC ............... *H01B 1/22* (2013.01); *B22F 1/0022* (2013.01); *B22F 9/20* (2013.01); *B22F 9/24* (2013.01); *B22F 9/30* (2013.01); *B82Y 30/00* (2013.01); *B82Y 40/00* (2013.01); *C09D 1/00* (2013.01); *C09D 5/38* (2013.01); *C09D 7/1266* (2013.01); *C09D 11/52* (2013.01); *H01B 1/02* (2013.01); *B22F 1/0018* (2013.01); *B22F 1/0059* (2013.01); *C22C 5/06* (2013.01)

(58) Field of Classification Search
CPC ............ H01B 1/02; H01B 1/20; H01B 1/22; C09D 11/52; C22C 5/06; B82Y 30/00; B82Y 40/00; B22F 1/0018; B22F 1/0022; B22F 1/0059
See application file for complete search history.

(56) References Cited

U.S. PATENT DOCUMENTS

| | | |
|---|---|---|
| 2009/0029148 A1 | 1/2009 | Hashimoto et al. |
| 2009/0208719 A1 | 8/2009 | Kang et al. |

(Continued)

FOREIGN PATENT DOCUMENTS

| | | |
|---|---|---|
| CN | 101528846 A | 9/2009 |
| CN | 101804458 A | 8/2010 |

(Continued)

OTHER PUBLICATIONS

International Searching Authority, International Preliminary Report on Patentability issued in counterpart International application No. PCTJP2013064946.

(Continued)

*Primary Examiner* — Khanh Tuan Nguyen
*Assistant Examiner* — Haidung Nguyen
(74) *Attorney, Agent, or Firm* — Sughrue Mion, PLLC

(57) ABSTRACT

Provided are silver nanoparticles having excellent dispersion stability and capable of forming on a substrate a silver element, such as a silver film or line, having excellent electrical conductivity and adhesivity through heating. A method for producing the silver nanoparticles, its dispersion liquid, and a substrate having a silver element formed thereon using the dispersion liquid are disclosed. The silver nanoparticles contain silver compound (A) of formula (1):

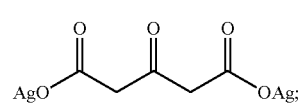

amine compound (B) having a primary amino group; and polymer (C) obtained by polymerization of a monomer composition containing diol (meth)acrylate compound (c1) having a urethane bond of formula (2):

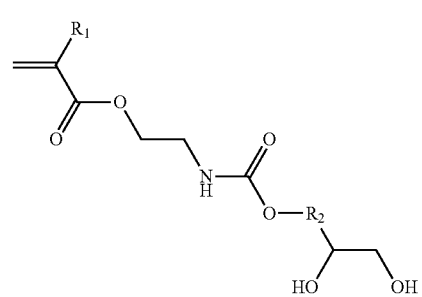

($R_1$: hydrogen atom or methyl group; $R_2$: —(CH2)n-; n: 1 to 4), and at least one monomer (c2) selected from (meth)acrylate monomers, acrylamide monomers, vinyl monomers, vinyl ether monomers, or monomers having an epoxy group.

6 Claims, 1 Drawing Sheet

(51) Int. Cl.
    *B22F 9/24*   (2006.01)
    *C09D 1/00*   (2006.01)
    *C09D 5/38*   (2006.01)
    *C09D 7/12*   (2006.01)
    *B22F 9/20*   (2006.01)
    *B22F 9/30*   (2006.01)

(56) References Cited

U.S. PATENT DOCUMENTS

| | | |
|---|---|---|
| 2009/0209693 A1 | 8/2009 | Suganuma et al. |
| 2010/0203333 A1 | 8/2010 | Mokhtari et al. |
| 2010/0247422 A1 | 9/2010 | Chung et al. |
| 2011/0315436 A1 | 12/2011 | Kim et al. |
| 2012/0043510 A1 | 2/2012 | Kurihara et al. |

FOREIGN PATENT DOCUMENTS

| | | |
|---|---|---|
| EP | 1905756 A1 | 4/2008 |
| EP | 2223756 A1 | 9/2010 |
| JP | 2004-27347 A | 1/2004 |
| JP | 2005-60824 A | 3/2005 |
| JP | 2006-124787 A | 5/2006 |
| JP | 2006-183072 A | 7/2006 |
| JP | 2007-84879 A | 4/2007 |
| JP | 2009-185390 A | 8/2009 |
| JP | 2010-265543 A | 11/2010 |
| JP | 2011506239 A | 3/2011 |
| JP | 2012007141 A | 1/2012 |
| JP | 2012-153634 A | 8/2012 |
| WO | 2004/012884 A1 | 2/2004 |
| WO | 2007/148684 A1 | 12/2007 |

OTHER PUBLICATIONS

International Searching Authority International Search Report for PCT/JP2013/064946 dated Jul. 23, 2013.

International Searching Authority, International Preliminary Report on Patentability dated Jan. 29, 2015, issued in counterpart International Application No. PCT/JP2013/064946.

European Patent Office, Communication dated Mar. 24, 2016, issued in counterpart European Application No. 13820453.2.

Ledwith D. M. et al. "A rapid, straightforward method for controlling the morphology of stable silver nanoparticles", Journal of Materials. Chemistry, Royal Society of Chemistry, GB, vol. 17, Jan. 1, 2007, p. 2459-2464, SP002584395.

SILVER NANOPARTICLES, METHOD FOR PRODUCING SAME, SILVER NANOPARTICLE DISPERSION LIQUID, AND BASE PROVIDED WITH SILVER MATERIAL

CROSS REFERENCE TO RELATED APPLICATIONS

This application is a National Stage of International Application No. PCT/JP2013/064946 filed May 29, 2013, claiming priority based on Japanese Patent Application No. 2012-160566 filed Jul. 19, 2012, the contents of all of which are incorporated herein by reference in their entirety.

FIELD OF ART

The present invention relates to silver nanoparticles which have excellent dispersibility in a solvent, and are capable of providing on a substrate a silver element, such as a silver film or line, having excellent electrical conductivity and adhesivity to a substrate through low-temperature sintering at not higher than 150° C., as well as to a method for preparing the same, a dispersion liquid containing the silver nanoparticles, and a substrate having a silver element formed thereon.

BACKGROUND ART

There is known a method for forming a metal film by preparing a liquid or paste ink of a metal, and applying or printing the ink on a substrate, followed by warming. The metal used here may be gold, silver, copper, or aluminum, with silver being generally used as a wiring material. Ink with silver, which usually contains silver metal dispersed in a dispersion solvent, is patterned on an interconnection substrate, and silver metal in the ink is sintered to form wiring. It is known that, when used as an electrically conductive material, silver metal is required to be sintered at a lower temperature, making use of melting point depression caused by the fine size of the dispersed silver metal particles. Fine metal nanoparticles of a nanoscale are raising expectations as a material sintering at a low temperature.

On the other hand, silver metal particles of such a fine size as to cause melting point depression are prone to contact and aggregate with each other, and a dispersant is required in the ink for preventing such aggregation. However, sintering the silver metal particles in the ink containing a dispersant may result in residual impurities originated from the dispersant. It is thus usually desired to remove the impurities by a high-temperature treatment or the like.

A general method of preparing silver nanoparticles includes, for example, reducing a silver salt composed of an inorganic acid and silver, such as silver nitrate, in the presence of a dispersant. With this method, however, a residual acid component originated from the silver salt may result, and high-temperature treatment is required for removal of the dispersant.

A method of forming silver metal with a silver salt containing an organic acid, instead of the inorganic acid, has also been reported. The organic silver proposed is, for example, silver salt of long-chain carboxylic acid, which is thermally decomposed or reduced in the presence of an alkylamine (Patent Publications 1 to 5). To the silver nanoparticles prepared from any organic silver, carboxylic acid or silver carboxylate is adhered, which is nonvolatile and thermally decomposed at higher temperatures. Thus in order to obtain a silver element, such as silver film or line, of excellent electrical conductivity, heat-treatment at not lower than 200° C. for a prolonged period of time may be required.

There have recently been made active attempts to form silver metal on a transparent resin substrate. A transparent resin substrate generally has a lower softening point compared to glass or the like, and thus a silver-forming material sintering at low temperatures is desired which realizes formation of silver metal through heating at not higher than 150° C. Sintering at low temperatures calls for removal at low temperatures of the dispersant adhered on the silver nanoparticles. Further, for the production of a durable metal-resin substrate, strong bond is required between the transparent resin substrate and the silver element.

As means for low temperature sintering, there has been proposed a method of mixing silver oxalate and amine to produce silver nanoparticles of silver oxalate-amine complex having a thermal decomposition temperature of 110° C. (Patent Publication 6). The silver nanoparticles obtained by this method provide a silver element, such as a metal film having good electrical conductivity, through sintering at not higher than 150° C., but this publication discloses nothing about durability, including adhesivity, of the obtained silver element. It is assumed that pure silver element obtained by such a mechanism of action to leave no residual organic substance in the resulting film has poor adhesivity to a substrate.

On the other hand, as means for improving adhesivity or strength of a silver element, there has been reported to use a composition wherein an organic polymer having a urethane group and a diol group is hybridized with an inorganic material (Patent Publication 7). However, with an organic polymer, which will remain as a resistive component in the resulting electrically conductive film, electrical conductivity comparable to bulk silver is hard to be achieved.

Patent Publication 1: JP 2005-60824-A
Patent Publication 2: JP 2007-84879-A
Patent Publication 3: WO 2004/012884
Patent Publication 4: JP 2004-27347-A
Patent Publication 5: JP 2009-185390-A
Patent Publication 6: JP 2010-265543-A
Patent Publication 7: WO 2007/148684

SUMMARY OF THE INVENTION

It is an object of the present invention to provide silver nanoparticles having excellent dispersion stability in a solvent, and capable of forming on a substrate a silver element, such as a silver film or line, having excellent electrical conductivity and adhesivity through heating even at a lower temperature for a short time, as well as a method for preparing the same and a dispersion liquid of the silver nanoparticle. It is also an object of the present invent ion to provide use of the silver nanoparticles or the dispersion liquid of the silver nanoparticle for the formation on a substrate of a silver element, such as a silver film or line, having excellent electrical conductivity and adhesivity.

It is another object of the present invention to provide a substrate having a silver element, such as a silver film or line, formed thereon, with excellent electrical conductivity and adhesivity, as well as a method for producing the substrate having a silver element formed thereon.

According to the present invention, there is provided silver nanoparticles obtained by reduction treatment (treatment with a reducing agent or heat treatment) of a silver-containing composition comprising:

silver compound (A) represented by formula (1):

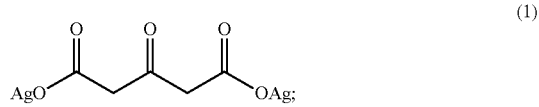

amine compound (B) having a primary amino group; and
polymer (C) obtained by polymerization of a monomer composition comprising diol (meth)acrylate compound (c1) having a urethane bond represented by formula (2):

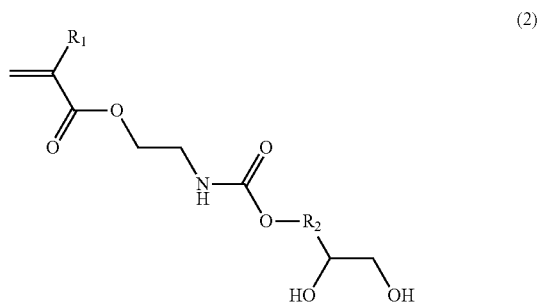

wherein $R_1$ is a hydrogen atom or a methyl group, $R_2$ is $-(CH_2)_n-$, and n is an integer of 1 to 4,
and at least one monomer (c2) selected from (meth) acrylate monomers, acrylamide monomers, vinyl monomers, vinyl ether monomers, or monomers having an epoxy group;
wherein a content of said amine compound (B) is 1 to 50 mole equivalent of silver elements in said silver compound (A), and a content of said polymer (C) is 0.1 to 0.9 parts by mass with respect to 100 parts by mass of silver elements in said silver compound (A).

According to the present invention, there is also provided a method for preparing silver nanoparticles comprising reduction treatment (treatment with a reducing agent or heat treatment) of a silver-containing composition comprising: the silver compound (A) represented by the formula (1); the amine compound (B) having a primary amino group; and the polymer (C); wherein a content of said amine compound (B) is 1 to 50 mole equivalent of silver elements in said silver compound (A), and a content of said polymer (C) is 0.1 to 0.9 parts by mass with respect to 100 parts by mass of silver elements in said silver compound (A).

According to the present invention, there is further provided a dispersion liquid of the silver nanoparticles comprising the silver nanoparticles and a solvent (sometimes referred to as a present dispersion liquid hereinbelow).

According to the present invention, there is also provided a substrate having a silver element formed thereon by applying the present dispersion liquid on a substrate, followed by heating.

The silver nanoparticles according to the present invention, which have been obtained by reduction treatment (treatment with a reducing agent or heat treatment) of a silver-containing composition containing the silver compound (A), the amine compound (B), and the polymer (C) at a particular ratio, are excellent in dispersion stability in a solvent. The dispersion liquid according to the present invention, which contains the silver nanoparticles and a solvent, is capable of forming on a substrate a silver element, such as a silver film or line, with excellent electrical conductivity and adhesivity at a lower temperature of not higher than 150° C. Further, sintering at a lower temperature of not higher than 150° C., the dispersion liquid of the present invention is capable of forming a silver element on a resin substrate of a low heat resistance. The silver element thus obtained, which exhibits the properties similar to those of bulk silver, maybe expected to be applied not only to wiring materials making use of its electrical conductivity, but also to various fields, including reflective or antibacterial materials.

PREFERRED EMBODIMENTS OF THE INVENTION

Figure 1:
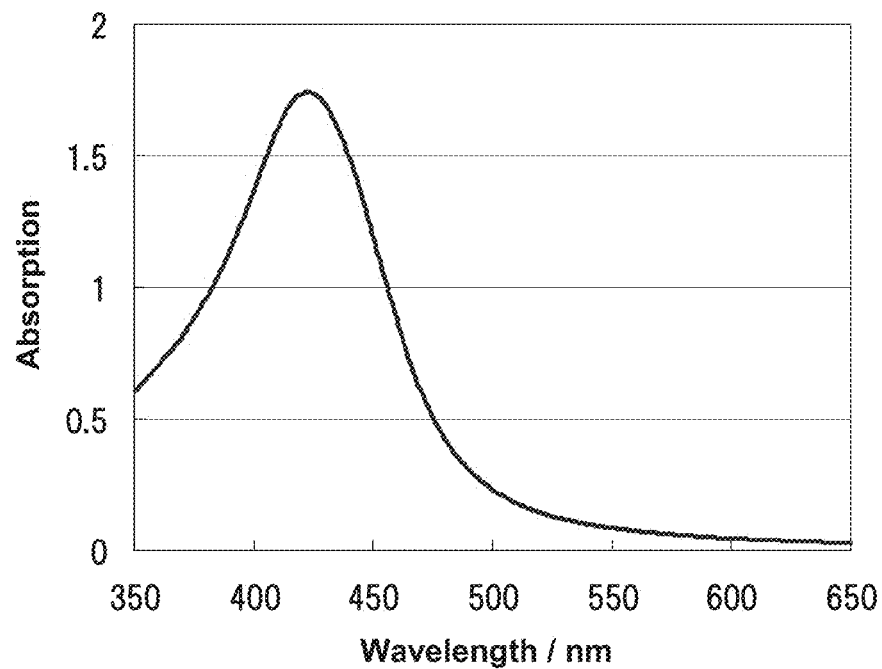
FIG. 1 shows UV-Vis spectrum of the silver nanoparticles prepared in Example 1-1.

The present invention will now be explained in detail.

The silver nanoparticles according to the present invention is obtained by the method of the present invention including reduction treatment of a silver-containing composition containing silver compound (A) represented by the formula (1), amine compound (B) having a primary amino group, and particular polymer (C) at a particular ratio.

The silver compound (A) is silver acetonedicarboxylate, and is usually in the form of powder. The silver compound (A) is low in solubility in a solvent and cannot undergo reduction reaction in a homogeneous system, so that stably dispersible nanoparticles are hard to result. However, by combining the silver compound (A) with the amine compound (B) having a primary amino group, the silver compound (A) dissolves to proceed with the reduction reaction in a homogeneous system. Further, the organic structure acetonedicarboxylic acid of the silver compound (A) decomposes into a volatile compound in the reaction system to leave silver only, so that the resulting silver nanoparticles contain no residual nonvolatile carboxylic acid, which allows formation of a silver element, such as a silver metal film or line, through heat treatment at not higher than 150° C.

Thus the silver nanoparticles according to the present invention may be used in the formation on a substrate of a silver element, such as a silver film or line, with excellent electrical conductivity and adhesivity.

In the silver-containing composition, the content of the amine compound (B) is 1 to 50 mole equivalent of the silver elements in the silver compound (A). At less than 1 mole equivalent, a homogeneous solution cannot be prepared and precipitation is prone to form in the reduction. Over 50 mole equivalent, effects commensurate with the content cannot be achieved.

The amine compound (B) is not particularly limited as long as it has in its structure a primary amino group, which is easy to be coordinated in the silver compound (A). Examples of the amine compound (B) may include 1-butylamine, 1-amylamine, 1-hexylamine, 1-heptylamine, 1-octylamine, 1-nonylamine, 1-decylamine, 1-undecylamine, 1-dodecylamine, 1-tridecylamine, 1-tetradecylamine, 1-pentadecylamine, 1-hexadecylamine, 1-octadecylamine, 2-ethylhexylamine, isobutylamine, isoamylamine, sec-butylamine, tert-butylamine, tert-amylamine, allylamine, oleylamine, benzylamine, 2-phenethylamine, 3-methoxypropylamine, 3-ethoxypropylamine, 3-isopropoxypropylamine, 3-butoxypropylamine, 2-ethylhexyloxypropylamine, 3-decyloxypropylamine, dibutylaminopropylamine, dimethylaminopropylamine, diethylaminopropylamine, and diisopropylaminoethylamine. One or a mixture of two or more of these may be used.

For the purpose of rendering the silver nanoparticles of the present invention particularly excellent in low temperature sintering, the amine compound (B) preferably has a structure which facilitates its removal from the film upon sintering, such as 1-butylamine, 1-amylamine, 1-hexylamine, 1-heptylamine, 1-octylamine, 2-ethylhexylamine, isobutylamine, isoamylamine, sec-butylamine, tert-butylamine, tert-amylamine, allylamine, 3-methoxypropylamine, 3-ethoxypropylamine, 3-isopropoxypropylamine, dimethylaminopropylamine, diethylaminopropylamine, and diisopropylaminoethylamine. One or a mixture of two or more of these may be used.

For the purpose of rendering the silver nanoparticles of the present invention particularly excellent in stability in a solvent, the amine compound (B) preferably has a structure with a side chain which causes steric repulsion, such as 1-decylamine, 1-undecylamine, 1-dodecylamine, 1-tridecylamine, 1-tetradecylamine, 1-pentadecylamine, 1-hexadecylamine, 1-octadecylamine, oleylamine, 2-ethylhexyloxypropylamine, 3-decyloxypropylamine, and dibutylaminopropylamine. One or a mixture of two or more of these may be used.

For the purpose of imparting both the low-temperature sintering and dispersion stability in a solvent to the silver nanoparticles of the present invention, two or more of the amine compound (B) may be used together at an arbitrary ratio, which may suitably be selected according to the desired low-temperature sintering and dispersion stability.

The polymer (C) is a copolymer obtained by polymerization of a monomer composition containing diol (meth)acrylate compound (c1) having a urethane bond represented by the formula (2) (sometimes referred to as monomer (c1) hereinbelow), and at least one monomer (c2) selected from (meth)acrylate monomers, acrylamide monomers, vinyl monomers, vinyl ether monomers, or monomers having an epoxy group.

The polymer (C) has a polar urethane group and two hydroxyl groups (a diol group) structurally derived from the monomer (c1). Each of the urethane and hydroxyl groups alone does not have a very strong interaction with silver, but as the three groups are arranged adjacent to each other, the polymer (C) may efficiently be adsorbed on the surfaces of the silver nanoparticles due to the coordination of the three groups, and may have improved dispersion stability due to the steric repulsion of the remaining polymer chain. When the silver nanoparticles of the present invention are prepared into a dispersion liquid, and applied to and heated on a substrate, the polymer (C) is desorbed from the surfaces of the silver nanoparticles, and will not interfere with the silver element formation. Further, the polymer (C) having been desorbed from the nanoparticle surfaces is directed toward the interface to tightly adhere the resulting silver element, such as a silver metal film or line, to the substrate.

In the formula (2) representing the monomer (c1), $R_1$ is a hydrogen atom or a methyl group, with a methyl group being preferred for easy molecular weight regulation. $R_2$ is —(CH$_2$)$_n$—, and n is an integer of 1 to 4. $R_2$ is specifically any of —CH$_2$—, —CH$_2$CH$_2$—, —CH$_2$CH$_2$CH$_2$—, or —CH$_2$CH$_2$CH$_2$CH$_2$—, with —CH$_2$— and —CH$_2$CH$_2$— being preferred for their availability.

The monomer (c1) may be, for example, glycerol-1-methacryloyloxyethyl urethane or glycerol-1-acryloyloxyethyl urethane, with the former being preferred for its ready synthesis.

The monomer (c1) may be synthesized, for example, according to a method disclosed in Patent Publication 7.

The (meth)acrylate monomers as the monomer (c2) may be, for example, methyl(meth)acrylate, butyl(meth)acrylate, isobutyl(meth)acrylate, lauryl(meth)acrylate, stearyl(meth)acrylate, dimethylaminoethyl(meth)acrylate, 2-hydroxyethyl(meth)acrylate, 2-methoxyethyl(meth)acrylate, 3-methacryloyloxypropyl trimethoxysilane, α-naphthylmethacrylate, 2-methyl-2-adamantyl(meth)acrylate, 2-(perfluorohexyl)ethyl(meth)acrylate, or 1H-1-(trifluoromethyl)trifluoroethylacrylate.

The acrylamide monomers as the monomer (c2) may be, for example, acrylamide, N-methylacrylamide, N-ethylacrylamide, N-methylolacrylamide, N-isopropylacrylamide, N,N-dimethylacrylamide, N,N-diethylacrylamide, or N,N-diisopropylacrylamide.

The vinyl monomers as the monomer (c2) may be, for example, styrene, 2-chlorostyrene, β-bromostyrene, vinylcarbazole, or perfluorohexylethylene.

The vinyl ether monomers as the monomer (c2) may be, for example, methyl vinyl ether.

The monomers having an epoxy group as the monomer (c2) may be, for example, glycidyl (meth)acrylate, 3,4-epoxycyclohexylmethyl(meth)acrylate, or 4-hydroxybutyl acrylate glycidylether.

In the monomer composition, the compositional ratio by mole of the monomer (c1) and the monomer (c2), monomer (c1): monomer (c2), is preferably 20:80 to 90:10, more preferably 30:70 to 80:20. At less than 20% in molar ratio of the monomer (c1), the adsorption efficiency to the resulting silver nanoparticles may be low to lower the dispersion stability. At over 90% in molar ratio of the monomer (c1), the resulting polymer (C) may associate together to lower the affinity to and thus the dispersion stability in a solvent.

The molecular weight of the polymer (C) in weight average molecular weight is preferably 5000 to 50000, more preferably 7000 to 40000. At less than 5000, the molecule is too small, and the dispersion stability in a solvent due to the steric repulsion may not be improved sufficiently. At over 50000, the polymer (C) may associate together to lower the affinity to and thus the dispersion stability in a solvent.

The polymer (C) may be prepared, for example, by radical polymerization, such as conventional solution, bulk, emulsion, or suspension polymerization of the monomer composition in an atmosphere of or substituted with an inert gas, such as nitrogen, carbon dioxide, or helium, as necessary. The polymerization temperature is usually 0 to 100° C., and the duration of the polymerization is usually 1 to 48 hours.

The polymerization may be effected in the presence of a polymerization initiator. Examples of the polymerization initiator may include 2,2'-azobis(2-amidinopropane) dihydrochloride, 4,4'-azobis(4-cyanovaleic acid), 2,2'-azobis(2-(5-methyl-2-imidazoline-2-yl)propane) dihydrochloride, 2,2'-azobis(2-(2-imidazoline-2-yl)propane) dihydrochloride, 2,2'-azobisisobutylamide dihydrate, ammonium persulfate, potassium persulfate, benzoyl peroxide, diisopropyl peroxydicarbonate, t-butylperoxy-2-ethylhexanoate, t-butyl peroxypivalate, t-butyl peroxydiisobutyrate, lauroyl peroxide, azobisisobutylonitrile, 2,2'-azobis(2,4-dimethylvaleronitrile), t-butyl peroxyneodecanoate (trade name "Perbutyl ND", manufactured by NOF CORPORATION), and mixtures thereof. The polymerization initiator may also be various redox promoters.

The amount of the polymerization initiator is preferably 0.01 to 5.0 parts by mass with respect to 100 parts by mass of the monomer composition. The obtained polymer may be purified by common purification, such as re-precipitation, dialysis, or ultrafiltration.

In the preparation of the silver nanoparticles of the present invention, a solvent may suitably be used for the purpose of regulating the silver concentration or the generation speed of the silver nanoparticles. The amount of the solvent is not particularly limited, and is preferably less than 3000 parts by mass with respect to 100 parts by mass of the silver compound (A) in view of the productivity and the environmental burden.

The solvent is not particularly limited as long as the silver nanoparticles are dispersed therein, and a single or a mixture of solvents may be used according to the purpose. Examples of the solvent may include methanol, ethanol, 1-propanol, 2-propanol, 1-butanol, 2-butanol, tert-butanol, 1-pentanol, 2-pentanol, 3-pentanol, tert-amylalcohol, 1-hexanol, 1-octanol, 2-ethyl-1-hexanol, ethylene glycol, butoxyethanol, methoxyethanol, ethoxyethanol, ethyl carbitol, ethyl carbitol acetate, butyl carbitol, butyl carbitol acetate, propylene glycol, propylene glycol monomethyl ether, propylene glycol monopropyl ether, propylene glycol monobutyl ether, and dipropylene glycol monomethyl ether; alcohols, such as terpineol; ethers, such as acetoxymethoxy propane, phenylglycidyl ether, and ethylene glycol glycidyl; ketones, such as acetone, methyl ethyl ketone, methyl isobutyl ketone, and γ-butyrolactone; nitriles, such as acetonitrile, propionitrile, butyronitrile, and isobutyronitrile; aromatics, such as benzene, toluene, and xylene; and water.

In the silver-containing composition, the content of the polymer (C) is 0.1 to 0.9 parts by mass, preferably 0.2 to 0.7 parts by mass, with respect to 100 parts by mass of the silver elements in the silver compound (A). At less than 0.1 parts by mass, the silver nanoparticles, though generated, have low dispersion stability in a solvent, and are prone to precipitation. In addition, the adhesion between the substrate and the silver element obtained by heat-treatment of the dispersion liquid of the present invention is insufficient. At over 0.9 parts by mass, the polymer (C) acts as an aggregating agent to cause precipitation.

In the preparation of the silver-containing composition, the order of mixing the silver compound (A), the amine compound (B), and the polymer (C) is not particularly limited.

The silver nanoparticles according to the present invention may be obtained by the method of the present invention including reduction treatment (treatment with a reducing agent or heat treatment) of the silver-containing composition.

The heat treatment may be pyrolytic reduction of a silver compound-amine complex. The heating temperature is preferably not lower than 50° C., more preferably 70 to 200° C. The treatment time is preferably 5 to 120 minutes. At lower than 50° C., progress of the pyrolytic reduction is too slow and the silver nanoparticles are not generated, whereas at over 200° C., the silver nanoparticles may be fused together.

The reducing agent may be, for example, formic acid, hydrazine, ascorbic acid, hydroquinone, sodium borohydride, tertiary amine, or amino alcohol, but is not limited to these.

The amount of the reducing agent is preferably 1.0 to 5.0 mole equivalent, more preferably 1.1 to 3.0 mole equivalent, of the silver elements in the silver compound (A) of the silver-containing composition. At less than 1.0 mole equivalent, the amount of the reducing agent is not sufficient, which causes retardation of the silver nanoparticle generation, whereas at over 5.0 mole equivalent, the silver nanoparticles are generated too quickly, which causes aggregation and possible precipitation.

The manner of adding the reducing agent is not particularly limited, and may be adjusted according to its reducing power. A reducing agent with a high reducing power may be diluted and added slowly, which results in stably-dispersed silver nanoparticles without precipitation. A mild reducing agent may be added at a time, or the reaction may proceed by heating. The treatment with a reducing agent may usually be carried out at about room temperature.

After the completion of addition of the reducing agent, the reduction reaction is terminated, and the resulting liquid may preferably be stirred further for promoting coordination to the generated silver nanoparticles. Here, the manner and duration of the stirring are not particularly limited.

The silver nanoparticles of the present invention has a mean volume diameter of usually 1 to 100 nm, and a silver content of usually not less than 90 mass %.

The silver nanoparticles of the present invention may suitably be used, particularly as an electrically conductive material, for forming an excellent silver element, such as a silver metal film or line, through heat treatment. The silver nanoparticles may thus be used for the production of a substrate having a silver element formed thereon.

The silver nanoparticles obtained by the method of the present invention may be used as obtained, but preferably purified by removing excess reducing agent and amine compound not involved in the coordination to the silver nanoparticles. The purification may be carried out by precipitation in a highly-polar solvent, and if this does not work, by centrifugation or ultrafiltration.

The dispersion liquid of the silver nanoparticles according to the present invention contains the silver nanoparticles of the present invention and a solvent, with the silver nanoparticles being dispersed in the solvent.

The solvent is not particularly limited as long as the silver nanoparticles are dispersed therein. Examples of the solvent may include methanol, ethanol, 1-propanol, 2-propanol, 1-butanol, 2-butanol, tert-butanol, 1-pentanol, 2-pentanol, 3-pentanol, tert-amylalcohol, 1-hexanol, 1-octanol, 2-ethyl-1-hexanol, ethylene glycol, butoxyethanol, methoxyethanol, ethoxyethanol, ethyl carbitol, ethyl carbitol acetate, butyl carbitol, butyl carbitol acetate, propylene glycol, propylene glycol monomethyl ether, propylene glycol monopropyl ether, propylene glycol monobutyl ether, and dipropylene glycol monomethyl ether; alcohols, such as terpineol; ethers, such as acetoxymethoxy propane, phenylglycidyl ether, and ethylene glycol glycidyl; ketones, such as acetone, methyl ethyl ketone, methyl isobutyl ketone, and γ-butyrolactone; nitriles, such as acetonitrile, propionitrile, butyronitrile, and isobutyronitrile; aromatics, such as benzene, toluene, and xylene; and water.

The silver content of the dispersion liquid of the silver nanoparticles may suitably be selected according to the use of the dispersion, and is usually preferably 10 to 85 mass %, and preferably 20 to 60 mass % for use as an electrically conductive material in view of the low-temperature sintering and dispersion stability in a solvent.

The dispersion liquid of the silver nanoparticles of the present invention may optionally contain, as necessary, for example, hydrocarbon, acetylene alcohol, or silicon oil for adjusting the levelling property on a substrate, or for example, resin or a plasticizer for adjusting the viscosity characteristics of the dispersion liquid. The dispersion liquid may optionally contain further for example, other electrically conductive powder, glass powder, surfactants, metal salts, and other additives generally used in a silver-containing composition, as necessary.

The substrate having a silver element formed thereon according to the present invention is a substrate, such as a base plate, having a silver element formed thereon by applying the dispersion liquid of the present invention on the substrate, and heating the substrate to form silver metal into a film- or line-shaped silver element.

The substrate to which the dispersion liquid of the present invention is to be applied is not particularly limited as long as the dispersion liquid may be printed thereon, and may be, for example, a plastic substrate, such as of polyester, polyimide, epoxy resin, bismaleimide-triazine resin, modified polyphenylene ether, ABS resin, polyamide, polyethylene, polyvinyl chloride, or fluororesins; a glass substrate, such as of soda glass, borosilicate glass, silica glass, or quartz glass; or an interconnection substrate having metal wiring of gold, silver, copper, aluminum, or the like. The substrate may have been subjected to primer treatment, plasma treatment, etching treatment, or solvent-absorbing layer treatment.

The substrate having a silver element formed thereon may be produced, using the dispersion liquid of the silver nanoparticles of the present invention and the substrate discussed above, by for example, the following methods.

The dispersion liquid of the present invention may be applied to the substrate by printing or the like method. The printing is not particularly limited, and may be, for example, ink-jet printing, microgravure printing, gravure offset printing, screen printing, roll-coating, air knife coating, blade coating, bar coating, die coating, or slide coating.

The temperature of the heating for forming a silver element on a substrate varies depending on the kind of the substrate, and may suitably be selected. For example, a heating temperature which is not higher than the heat resistance temperature of the substrate and gives a silver element with excellent electrical conductivity (volume resistivity of less than $1.0 \times 10^{-5}$ Ω·cm) is preferred, and specifically a temperature range of 100 to 200° C. is preferred. The heating time varies depending on the heating temperature so that a silver element with excellent electrical conductivity is formed, and is usually 1 to 120 minutes, preferably 10 to 60 minutes.

The thickness of the silver element formed on a substrate varies depending on the application, and is preferably 0.2 to 50 μm for use as a wiring material in view of the electrical conductivity and durability, and preferably 0.5 to 30 μm in view of drying and sintering in heating.

The use of the substrate having a silver element formed thereon according to the present invention is not particularly limited, and is particularly useful, for example, in the field of electronic materials, such as wiring of electronics devices, in the light of its electrical conductivity represented by a volume resistivity on the order of $10^{-6}$ Ω·cm, which is comparable to that of bulk silver, and tight adhesion and durability of the silver element on the substrate.

EXAMPLES

The present invention will now be explained with reference to Examples, which are not intended to limit the present invention.

In the following Examples, silver elements mean the silver elements in a silver compound.

Synthesis Example

Each of polymers (C1) to (C10) was obtained by a routine method from a monomer composition of monomers (c1) and (c2) as shown in Table 1. The obtained polymers were used in the following Examples and Comparative Examples.

The weight average molecular weight of each polymer was determined under the following conditions in the following measuring apparatus.

Measuring apparatus: TOSOH BUILD-UP GPC SYSTEM (Detector: RI)
Column: TSKgel G3000PWXL+TSKgel G5000PWXL (manufactured by TOSOH CORPORATION)
Eluent: water/ethanol=7/3 (v/v)
Measurement conditions: flow rate: 0.5 ml/min.; column oven temperature: 40° C.; reference material: polyethylene oxide

TABLE 1

| | Monomer composition (molar ratio) | | | | | | | Weight average molecular weight | |
|---|---|---|---|---|---|---|---|---|---|
| | Monomer (c1) | Monomer (c2) | | | | | | | |
| Polymer | GLYMOU | BMA | SMA | N-MAAm | St | MBE | HBAGE | Mw | Mw/Mn |
| Polymer (C1) | 60 | 20 | | 20 | | | | 25000 | 3.2 |
| Polymer (C2) | 60 | 20 | | | 20 | | | 19000 | 3.5 |
| Polymer (C3) | 60 | 20 | | | | 20 | | 22000 | 3.4 |
| Polymer (C4) | 60 | 20 | | | | | 20 | 17000 | 3.5 |
| Polymer (C5) | 60 | | 20 | 20 | | | | 26000 | 3.6 |
| Polymer (C6) | 60 | | | | 20 | | 20 | 22500 | 3.8 |
| Polymer (C7) | 80 | 10 | | 10 | | | | 28500 | 3.5 |
| Polymer (C8) | 40 | 30 | | 30 | | | | 17000 | 3.5 |
| Polymer (C9) | 60 | 20 | | 20 | | | | 9000 | 2.2 |
| Polymer (C10) | 60 | 40 | | | | | | 21000 | 3.7 |

GLYMOU: Glycerol-1-methacryloyloxyethyl urethane
BMA: Butylmethacrylate
SMA: Stearylmethacrylate
N-MAAm: N-methylolacrylamide
St: Styrene
MBE: Methyl vinyl ether
HBAGE: 4-hydroxybutyl acrylate glycidylether

Example 1-1

Preparation of Silver Nanoparticles

As silver compound (A), 3.6 g (10.0 mmol) of silver acetonedicarboxylate, 7.8 g (60.0 mmol, 3 mole equivalent of the silver elements) of 2-ethylhexylamine, and 36.0 g (10 times the weight of the silver compound) of toluene were mixed to obtain a faint yellow transparent solution. To this solution, 11 mg (0.5 parts by mass with respect to 100 parts by mass of the silver elements) of polymer (C1) was added. Then 1.4 g (30.0 mmol, 1.5 mole equivalent to the silver elements) of formic acid was slowly added dropwise, and the reaction liquid was stirred at room temperature (25° C.) for 1 hour to obtain silver nanoparticles.

The silver nanoparticles thus prepared were evaluated as follows. The results are shown in Table 2.

The absorption spectrum was analyzed in UV-VIS Spectrophotometer (manufactured by JASCO CORPORATION), and the maximum absorption spectrum derived from the surface plasmon resonance of the silver nanoparticles was observed at 420 nm (FIG. 1).

The particle size of the silver nanoparticles was determined in a dynamic light scattering device (manufactured by MALVERN INSTRUMENTS), and the mean volume diameter was 17.4 nm.

Figure 2:
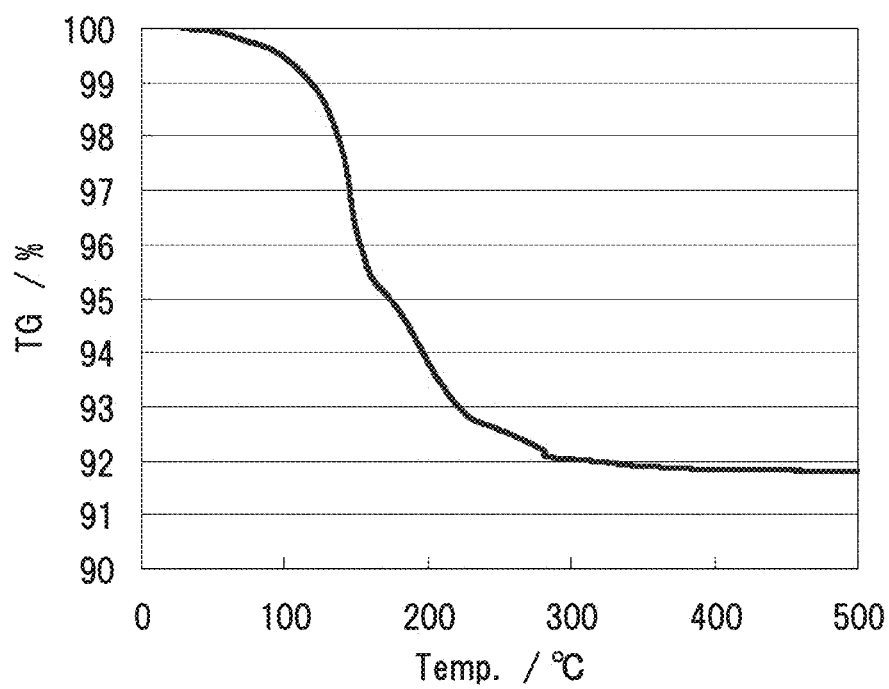
FIG. 2 is a graph showing the result of the thermogravimetric analysis of the silver nanoparticles prepared in Example 1-1.

Methanol was introduced into the reaction liquid in which the silver nanoparticles had been synthesized, to aggregate and precipitate the silver nanoparticles. The precipitated silver nanoparticles were separated by filtration through a PTFE filter to obtain 2.0 g of silver nanoparticles. The silver nanoparticles thus obtained were subjected to TG analysis in a thermogravimetric analyzer (manufactured by SII NANO-TECHNOLOGY INC.). The analysis was carried out at a temperature increase rate of 10° C./min, and the measurement was made in the atmospheric air. As a result, the residue after the thermogravimetric analysis was 92.0% (FIG. 2).

Examples 1-2 to 1-40

Silver nanoparticles were prepared in each composition shown in Tables 2 and 3 in the same way as in Example 1-1.

The obtained silver nanoparticles were evaluated in the same way as in Example 1-1, and the maximum absorption derived from the surface plasmon resonance of the silver nanoparticles was observed with UV-VIS Spectrophotometer. The mean volume diameter and the heating residue were determined in the same way. The results are shown in Tables 2 and 3.

In the tables, 2-EHA stands for 2-ethylhexylamine, HA for hexylamine, OA for octylamine, 3-EPA for 3-ethoxypropylamine, DMAPA for dimethylaminopropylamine, LA for laurylamine, OLA for oleylamine, and IPA for isopropyl alcohol.

Also in the tables, Note 1 represents the part by mass with respect to 100 parts by mass of the silver elements in the silver compound (A), Note 2 represents the mole equivalent of the silver elements in the silver compound (A), and Note 3 represents the part by mass with respect to 100 parts by mass of the silver compound (A).

Example 1-41

As silver compound (A), 3.6 g (10.0 mmol) of silver acetonedicarboxylate, 7.8 g (60.0 mmol, 3 mole equivalent of the silver elements) of 2-ethylhexylamine, and 36.0 g (10 times the weight of the silver compound) of toluene were mixed to obtain a faint yellow transparent solution. To this solution, 11 mg (0.5 parts by mass with respect to 100 parts by mass of the silver elements) of polymer (C1) was added. The resulting mixed solution was stirred for 1 hour in an oil bath at 70° C. to prepare silver nanoparticles.

Methanol was introduced into the reaction liquid in which the silver nanoparticles had been synthesized, to aggregate and precipitate the silver nanoparticles. The precipitated silver nanoparticles were separated by filtration through a PTFE filter to obtain 2.1 g of silver nanoparticles. The silver nanoparticles thus obtained were subjected to TG analysis in a thermogravimetric analyzer (manufactured by SII NANO-TECHNOLOGY INC.). The analysis was carried out at a temperature increase rate of 10° C./min, and the measurement was made in the atmospheric air. The results are shown in Table 3.

Examples 1-42 to 1-43

Silver nanoparticles were prepared at the reaction temperature shown in Table 3 in the same way as in Example 1-41.

The obtained silver nanoparticle were evaluated in the same way as in Example 1-1, and the maximum absorption derived from the surface plasmon resonance of the silver nanoparticles was observed with UV-VIS Spectrophotometer. The mean volume diameter and the heating residue were determined in the same way. The results are shown in Table 3.

Example 1-44

Silver nanoparticles were prepared in the same way as in Example 1-41 except that the reaction solvent was not used.

The obtained silver nanoparticles were evaluated in the same way as in Example 1-1, and the maximum absorption derived from the surface plasmon resonance of the silver nanoparticles was observed with UV-VIS Spectrophotometer. The mean volume diameter and the heating residue were determined in the same way. The results are shown in Table 3.

TABLE 2

| | Silver compound (A) | | | Polymer (C) | | | Amine compound (B) (g) | | | | | | | |
|---|---|---|---|---|---|---|---|---|---|---|---|---|---|---|
| | Mass (g) | Converted into mole (mmol) | Weight of silver elements (g) | Polymer used | mg | Note 1 (part by mass) | 2-EHA | HA | OA | 3-EPA | DMAPA | LA | OLA | Note 2 (mole equivalent) |
| Example 1-1 | 3.6 | 10.0 | 2.2 | Polymer (C1) | 11 | 0.5 | 7.8 | | | | | | | 3.0 |
| Example 1-2 | 3.6 | 10.0 | 2.2 | Polymer (C2) | 11 | 0.5 | 7.8 | | | | | | | 3.0 |

TABLE 2-continued

| | | | | | | | | | | |
|---|---|---|---|---|---|---|---|---|---|---|
| Example 1-3 | 3.6 | 10.0 | 2.2 | Polymer (C3) | 11 | 0.5 | 7.8 | | | 3.0 |
| Example 1-4 | 3.6 | 10.0 | 2.2 | Polymer (C4) | 11 | 0.5 | 7.8 | | | 3.0 |
| Example 1-5 | 3.6 | 10.0 | 2.2 | Polymer (C5) | 11 | 0.5 | 7.8 | | | 3.0 |
| Example 1-6 | 3.6 | 10.0 | 2.2 | Polymer (C6) | 11 | 0.5 | 7.8 | | | 3.0 |
| Example 1-7 | 3.6 | 10.0 | 2.2 | Polymer (C7) | 11 | 0.5 | 7.8 | | | 3.0 |
| Example 1-8 | 3.6 | 10.0 | 2.2 | Polymer (C8) | 11 | 0.5 | 7.8 | | | 3.0 |
| Example 1-9 | 3.6 | 10.0 | 2.2 | Polymer (C9) | 11 | 0.5 | 7.8 | | | 3.0 |
| Example 1-10 | 3.6 | 10.0 | 2.2 | Polymer (C10) | 11 | 0.5 | 7.8 | | | 3.0 |
| Example 1-11 | 3.6 | 10.0 | 2.2 | Polymer (C1) | 4 | 0.2 | 7.8 | | | 3.0 |
| Example 1-12 | 3.6 | 10.0 | 2.2 | Polymer (C1) | 15 | 0.7 | 7.8 | | | 3.0 |
| Example 1-13 | 3.6 | 10.0 | 2.2 | Polymer (C1) | 11 | 0.5 | 2.6 | | | 1.0 |
| Example 1-14 | 3.6 | 10.0 | 2.2 | Polymer (C1) | 11 | 0.5 | 12.9 | | | 5.0 |
| Example 1-15 | 3.6 | 10.0 | 2.2 | Polymer (C1) | 11 | 0.5 | 7.8 | | | 3.0 |
| Example 1-16 | 3.6 | 10.0 | 2.2 | Polymer (C1) | 11 | 0.5 | 7.8 | | | 3.0 |
| Example 1-17 | 3.6 | 10.0 | 2.2 | Polymer (C1) | 11 | 0.5 | 7.8 | | | 3.0 |
| Example 1-18 | 3.6 | 10.0 | 2.2 | Polymer (C1) | 11 | 0.5 | 7.8 | | | 3.0 |
| Example 1-19 | 3.6 | 10.0 | 2.2 | Polymer (C1) | 11 | 0.5 | | 6.1 | | 3.0 |
| Example 1-20 | 3.6 | 10.0 | 2.2 | Polymer (C1) | 11 | 0.5 | | | 7.8 | 3.0 |

| | Reducing agent | | | Solvent | | | Evaluation | |
|---|---|---|---|---|---|---|---|---|
| | Kind | g | Note 2 (mole equivalent) | Kind | g | Note 3 (part by mass) | Reaction temp. °C | Heating residue (weight %) | Mean volume diameter (nm) |
| Example 1-1 | Formic acid | 1.4 | 1.5 | Toluene | 36.0 | 1000 | 25 | 92.0 | 17.4 |
| Example 1-2 | Formic acid | 1.4 | 1.5 | Toluene | 36.0 | 1000 | 25 | 93.5 | 18.0 |
| Example 1-3 | Formic acid | 1.4 | 1.5 | Toluene | 36.0 | 1000 | 25 | 92.7 | 20.4 |
| Example 1-4 | Formic acid | 1.4 | 1.5 | Toluene | 36.0 | 1000 | 25 | 92.5 | 16.8 |
| Example 1-5 | Formic acid | 1.4 | 1.5 | Toluene | 36.0 | 1000 | 25 | 92.8 | 20.1 |
| Example 1-6 | Formic acid | 1.4 | 1.5 | Toluene | 36.0 | 1000 | 25 | 92.4 | 19.5 |
| Example 1-7 | Formic acid | 1.4 | 1.5 | Toluene | 36.0 | 1000 | 25 | 92.5 | 20.7 |
| Example 1-8 | Formic acid | 1.4 | 1.5 | Toluene | 36.0 | 1000 | 25 | 92.1 | 18.6 |
| Example 1-9 | Formic acid | 1.4 | 1.5 | Toluene | 36.0 | 1000 | 25 | 92.5 | 19.5 |
| Example 1-10 | Formic acid | 1.4 | 1.5 | Toluene | 36.0 | 1000 | 25 | 93.5 | 21.0 |
| Example 1-11 | Formic acid | 1.4 | 1.5 | Toluene | 36.0 | 1000 | 25 | 91.5 | 20.7 |
| Example 1-12 | Formic acid | 1.4 | 1.5 | Toluene | 36.0 | 1000 | 25 | 91.8 | 19.5 |
| Example 1-13 | Formic acid | 1.4 | 1.5 | Toluene | 36.0 | 1000 | 25 | 97.8 | 33.6 |
| Example 1-14 | Formic acid | 1.4 | 1.5 | Toluene | 36.0 | 1000 | 25 | 93.6 | 15.6 |
| Example 1-15 | Formic acid | 0.9 | 1.0 | Toluene | 36.0 | 1000 | 25 | 92.6 | 25.8 |
| Example 1-16 | Formic acid | 2.3 | 2.5 | Toluene | 36.0 | 1000 | 25 | 93.6 | 14.7 |
| Example 1-17 | — | | 0 | Toluene | | | 25 | 93.1 | 33.5 |
| Example 1-18 | Formic acid | 1.4 | 1.5 | Toluene | 72.0 | 2000 | 25 | 95.0 | 10.5 |
| Example 1-19 | Formic acid | 1.4 | 1.5 | Toluene | 36.0 | 1000 | 25 | 97.6 | 21.0 |
| Example 1-20 | Formic acid | 1.4 | 1.5 | Toluene | 36.0 | 1000 | 25 | 95.7 | 26.7 |

TABLE 3

| | Silver compound (A) | | | Polymer (C) | | | Amine compound (B) (g) | | | | | | | |
|---|---|---|---|---|---|---|---|---|---|---|---|---|---|---|
| | Mass (g) | Converted into mole (mmol) | Weight of silver elements (g) | Polymer used | mg | Note 1 (part by mass) | 2-EHA | HA | OA | 3-EPA | DMAPA | LA | OLA | Note 2 (mole equivalent) |
| Example 1-21 | 3.6 | 10.0 | 2.2 | Polymer (C1) | 11 | 0.5 | | | | 6.2 | | | | 3.0 |
| Example 1-22 | 3.6 | 10.0 | 2.2 | Polymer (C1) | 11 | 0.5 | | | | | 6.1 | | | 3.0 |
| Example 1-23 | 3.6 | 10.0 | 2.2 | Polymer (C1) | 11 | 0.5 | 3.9 | 3.0 | | | | | | 3.0 |
| Example 1-24 | 3.6 | 10.0 | 2.2 | Polymer (C1) | 11 | 0.5 | 6.2 | | | | | 2.2 | | 3.0 |
| Example 1-25 | 3.6 | 10.0 | 2.2 | Polymer (C1) | 11 | 0.5 | 6.2 | | | | | | 3.2 | 3.0 |
| Example 1-26 | 3.6 | 10.0 | 2.2 | Polymer (C1) | 11 | 0.5 | | 4.9 | | | | 2.2 | | 3.0 |
| Example 1-27 | 3.6 | 10.0 | 2.2 | Polymer (C1) | 11 | 0.5 | | 4.9 | | | | | 3.2 | 3.0 |
| Example 1-28 | 3.6 | 10.0 | 2.2 | Polymer (C1) | 11 | 0.5 | | | 6.2 | | | 2.2 | | 3.0 |
| Example 1-29 | 3.6 | 10.0 | 2.2 | Polymer (C1) | 11 | 0.5 | | | 6.2 | | | | 3.2 | 3.0 |
| Example 1-30 | 3.6 | 10.0 | 2.2 | Polymer (C1) | 11 | 0.5 | | | | 4.9 | | 2.2 | | 3.0 |
| Example 1-31 | 3.6 | 10.0 | 2.2 | Polymer (C1) | 11 | 0.5 | | | | 4.9 | | | 3.2 | 3.0 |
| Example 1-32 | 3.6 | 10.0 | 2.2 | Polymer (C1) | 11 | 0.5 | | | | | 4.9 | 2.2 | | 3.0 |
| Example 1-33 | 3.6 | 10.0 | 2.2 | Polymer (C1) | 11 | 0.5 | | | | | 4.9 | | 3.2 | 3.0 |
| Example 1-34 | 3.6 | 10.0 | 2.2 | Polymer (C1) | 11 | 0.5 | 3.1 | | | | 3.1 | 1.6 | | 3.0 |
| Example 1-35 | 3.6 | 10.0 | 2.2 | Polymer (C1) | 11 | 0.5 | 7.8 | | | | | | | 3.0 |
| Example 1-36 | 3.6 | 10.0 | 2.2 | Polymer (C1) | 11 | 0.5 | 7.8 | | | | | | | 3.0 |
| Example 1-37 | 3.6 | 10.0 | 2.2 | Polymer (C1) | 11 | 0.5 | 7.8 | | | | | | | 3.0 |
| Example 1-38 | 3.6 | 10.0 | 2.2 | Polymer (C1) | 11 | 0.5 | 7.8 | | | | | | | 3.0 |
| Example 1-39 | 3.6 | 10.0 | 2.2 | Polymer (C1) | 11 | 0.5 | 7.8 | | | | | | | 3.0 |

TABLE 3-continued

| | | | | | | | | | | | |
|---|---|---|---|---|---|---|---|---|---|---|---|
| Example 1-40 | 3.6 | 10.0 | 2.2 | Polymer (C1) | 11 | 0.5 | 3.1 | 3.1 | 1.6 | 3.0 |
| Example 1-41 | 3.6 | 10.0 | 2.2 | Polymer (C1) | 11 | 0.5 | 7.8 | | | 3.0 |
| Example 1-42 | 3.6 | 10.0 | 2.2 | Polymer (C1) | 11 | 0.5 | 7.8 | | | 3.0 |
| Example 1-43 | 3.6 | 10.0 | 2.2 | Polymer (C1) | 11 | 0.5 | 7.8 | | | 3.0 |
| Example 1-44 | 3.6 | 10.0 | 2.2 | Polymer (C1) | 11 | 0.5 | 7.8 | | | 3.0 |

| | Reducing agent | | | Solvent | | Reaction temp. °C. | Evaluation | |
|---|---|---|---|---|---|---|---|---|
| | Kind | g | Note 2 (mole equivalent) | Kind | g | | Heating residue (weight %) | Mean volume diameter (nm) |
| Example 1-21 | Formic acid | 1.4 | 1.5 | Toluene | 36.0 | 1000 25 | 96.6 | 26.1 |
| Example 1-22 | Formic acid | 1.4 | 1.5 | Toluene | 36.0 | 1000 25 | 96.7 | 25.8 |
| Example 1-23 | Formic acid | 1.4 | 1.5 | Toluene | 36.0 | 1000 25 | 94.0 | 25.5 |
| Example 1-24 | Formic acid | 1.4 | 1.5 | Toluene | 36.0 | 1000 25 | 90.5 | 15.3 |
| Example 1-25 | Formic acid | 1.4 | 1.5 | Toluene | 36.0 | 1000 25 | 91.7 | 22.8 |
| Example 1-26 | Formic acid | 1.4 | 1.5 | Toluene | 36.0 | 1000 25 | 93.5 | 26.7 |
| Example 1-27 | Formic acid | 1.4 | 1.5 | Toluene | 36.0 | 1000 25 | 91.9 | 19.2 |
| Example 1-28 | Formic acid | 1.4 | 1.5 | Toluene | 36.0 | 1000 25 | 92.0 | 15.3 |
| Example 1-29 | Formic acid | 1.4 | 1.5 | Toluene | 36.0 | 1000 25 | 92.5 | 17.1 |
| Example 1-30 | Formic acid | 1.4 | 1.5 | Toluene | 36.0 | 1000 25 | 94.6 | 19.2 |
| Example 1-31 | Formic acid | 1.4 | 1.5 | Toluene | 36.0 | 1000 25 | 91.0 | 19.2 |
| Example 1-32 | Formic acid | 1.4 | 1.5 | Toluene | 36.0 | 1000 25 | 90.7 | 18.9 |
| Example 1-33 | Formic acid | 1.4 | 1.5 | Toluene | 36.0 | 1000 25 | 93.5 | 19.2 |
| Example 1-34 | Formic acid | 1.4 | 1.5 | Toluene | 36.0 | 1000 25 | 94.9 | 30.0 |
| Example 1-35 | Ascorbic acid | 5.3 | 1.5 | Toluene | 36.0 | 1000 25 | 90.7 | 33.3 |
| Example 1-36 | NaBH$_4$ | 1.1 | 1.5 | Toluene | 36.0 | 1000 25 | 94.5 | 35.2 |
| Example 1-37 | Hydrazine | 1.0 | 1.5 | Toluene | 36.0 | 1000 25 | 94.6 | 34.5 |
| Example 1-38 | Formic acid | 1.4 | 1.5 | Hexane | 36.0 | 1000 25 | 95.0 | 20.4 |
| Example 1-39 | Formic acid | 1.4 | 1.5 | Isodecane | 36.0 | 1000 25 | 92.1 | 21.0 |
| Example 1-40 | Formic acid | 1.4 | 1.5 | IPA | 36.0 | 1000 25 | 93.3 | 34.2 |
| Example 1-41 | None | — | — | Toluene | 36.0 | 1000 70 | 94.5 | 17.8 |
| Example 1-42 | None | — | — | Toluene | 36.0 | 1000 100 | 92.8 | 19.7 |
| Example 1-43 | None | — | — | Toluene | 36.0 | 1000 150 | 92.5 | 20.5 |
| Example 1-44 | None | — | — | None | 36.0 | 1000 100 | 91.5 | 22.4 |

Comparative Examples 1-1 to 1-5

Silver nanoparticles were prepared in each composition shown in Table 4 in the same way as in Example 1-1.

The maximum absorption derived from the surface plasmon resonance of the obtained silver nanoparticles was observed with UV-VIS Spectrophotometer in the same way as in Example 1-1. The weight of residue in the TG analysis and the mean volume diameter were determined in the same way. The results are shown in Table 4.

In Comparative Example 1-4, though silver particles were generated, the reaction system did not contain an amine compound having a primary amino group, so that the reaction system was inhomogenous, coarse particles precipitated, and silver nanoparticles were not obtained. Evaluation could thus not be made.

In Comparative Example 1-5, reduction treatment by thermal decomposition or treatment with a reducing agent was not performed, so that the formation of silver particles did not proceed and silver nanoparticles were not obtained. Evaluation could thus not be made.

TABLE 4

| | Silver compound (A) | | | Polymer (C) | | | Amine compound (B) (g) | | | | | |
|---|---|---|---|---|---|---|---|---|---|---|---|---|
| | Compound used | Mass (g) | Converted into mole (mmol) | Weight of silver elements (g) | Polymer used | mg | Note 1 (part by mass) | 2-EHA | HA | OA | 3-EPA | DMAPA | LA |
| Comparative Example 1-1 | Silver dodecylate | 3.1 | 10.0 | 1.1 | Polymer (C1) | 5.5 | 0.5 | 3.9 | | | | | |
| Comparative Example 1-2 | Silver compound (A) | 3.6 | 10.0 | 2.2 | — | — | — | 7.8 | | | | | |
| Comparative Example 1-3 | Silver compound (A) | 3.6 | 10.0 | 2.2 | Polymer (C1) | 110 | 5.0 | 7.8 | | | | | |
| Comparative Example 1-4 | Silver compound (A) | 3.6 | 10.0 | 2.2 | Polymer (C1) | 11 | 0.5 | | | | | | |
| Comparative Example 1-5 | Silver compound (A) | 3.6 | 10.0 | 2.2 | Polymer (C1) | 11 | 0.5 | 7.8 | | | | | |

TABLE 4-continued

| | | Amine compound | | Reducing agent | | Solvent | | Reaction temp. ° C. | Evaluation | |
|---|---|---|---|---|---|---|---|---|---|---|
| | | (B) (g) | | | | | | | | Mean |
| | | OLA | Note 2 (mole equivalent) | Kind | g | Note 2 (mole equivalent) | Kind | g | Note 3 (part by mass) | | Heating residue (weight %) | volume diameter (nm) |

| | OLA | Note 2 (mole equivalent) | Kind | g | Note 2 (mole equivalent) | Kind | g | Note 3 (part by mass) | Reaction temp. ° C. | Heating residue (weight %) | Mean volume diameter (nm) |
|---|---|---|---|---|---|---|---|---|---|---|---|
| Comparative Example 1-1 | 3.0 | | Formic acid | 0.7 | 1.5 | Toluene | 31.0 | 1000 | 25 | 82.4 | 25.2 |
| Comparative Example 1-2 | 3.0 | | Formic acid | 1.4 | 1.5 | Toluene | 36.0 | 1000 | 25 | 92.5 | 21.3 |
| Comparative Example 1-3 | 3.0 | | Formic acid | 1.4 | 1.5 | Toluene | 36.0 | 1000 | 25 | 93.3 | 17.7 |
| Comparative Example 1-4 | — | | Formic acid | 1.4 | 1.5 | Toluene | 36.0 | 1000 | 25 | — | — |
| Comparative Example 1-5 | 3.0 | | — | — | — | Toluene | 36.0 | 1000 | 25 | — | — |

Example 2-1

Preparation and Storage Stability Evaluation of Dispersion Liquid of Silver Nanoparticles The silver nanoparticles obtained in Example 1-1 were re-dispersed in toluene at a silver concentration of 30 mass % to prepare a dispersion liquid of the silver nanoparticles.

The storage stability of the obtained dispersion liquid was evaluated according to the presence/absence of precipitation after being left to stand. The evaluated storage stability was graded as ⊚ when no precipitation was observed for 6 months or more; ○ when no precipitation was observed for not less than 3 months and less than 6 months; Δ when no precipitation was observed for not less than 1 month and less than 3 months; and x when precipitation was observed in less than 1 month. The results are shown in Table 5.

Examples 2-2 to 2-54

Using the silver nanoparticles and the solvent shown in Table 5, a dispersion liquid of the silver nanoparticles was prepared in the same way as in Example 2-1. The obtained dispersion liquid was evaluated in the same way as in Example 2-1. The results are shown in Table 5.

TABLE 5

| | Silver nanoparticles used | Solvent | Storage stability 5° C. | Storage stability 25° C. |
|---|---|---|---|---|
| Example 2-1 | Example 1-1 | Toluene | ○ | ○ |
| Example 2-2 | Example 1-2 | Toluene | ○ | ○ |
| Example 2-3 | Example 1-3 | Toluene | ⊚ | ○ |
| Example 2-4 | Example 1-4 | Toluene | ⊚ | ○ |
| Example 2-5 | Example 1-5 | Toluene | ⊚ | ○ |
| Example 2-6 | Example 1-6 | Toluene | ⊚ | ○ |
| Example 2-7 | Example 1-7 | Toluene | ⊚ | ⊚ |
| Example 2-8 | Example 1-8 | Toluene | ⊚ | ○ |
| Example 2-9 | Example 1-9 | Toluene | ⊚ | ○ |
| Example 2-10 | Example 1-10 | Toluene | ⊚ | ○ |
| Example 2-11 | Example 1-11 | Toluene | ○ | ○ |
| Example 2-12 | Example 1-12 | Toluene | ○ | ○ |
| Example 2-13 | Example 1-13 | Toluene | ○ | ○ |
| Example 2-14 | Example 1-14 | Toluene | ○ | ○ |
| Example 2-15 | Example 1-15 | Toluene | ○ | ○ |
| Example 2-16 | Example 1-16 | Toluene | ○ | ○ |
| Example 2-17 | Example 1-17 | Toluene | ○ | ○ |
| Example 2-18 | Example 1-18 | Toluene | ○ | ○ |
| Example 2-19 | Example 1-19 | Toluene | ○ | Δ |
| Example 2-20 | Example 1-20 | Toluene | ○ | ○ |
| Example 2-21 | Example 1-21 | Toluene | ○ | Δ |
| Example 2-22 | Example 1-22 | Toluene | ○ | ○ |
| Example 2-23 | Example 1-23 | Toluene | ⊚ | ○ |
| Example 2-24 | Example 1-24 | Toluene | ⊚ | ○ |
| Example 2-25 | Example 1-25 | Toluene | ⊚ | ○ |
| Example 2-26 | Example 1-26 | Toluene | ⊚ | ○ |
| Example 2-27 | Example 1-27 | Toluene | ⊚ | ○ |
| Example 2-28 | Example 1-28 | Toluene | ⊚ | ○ |
| Example 2-29 | Example 1-29 | Toluene | ⊚ | ○ |
| Example 2-30 | Example 1-30 | Toluene | ⊚ | ○ |
| Example 2-31 | Example 1-31 | Toluene | ⊚ | ○ |
| Example 2-32 | Example 1-32 | Toluene | ⊚ | ○ |
| Example 2-33 | Example 1-33 | Toluene | ⊚ | ○ |
| Example 2-34 | Example 1-34 | Toluene | ⊚ | ○ |
| Example 2-35 | Example 1-35 | Toluene | ⊚ | ○ |
| Example 2-36 | Example 1-36 | Toluene | ○ | ○ |
| Example 2-37 | Example 1-37 | Toluene | ○ | ○ |
| Example 2-38 | Example 1-38 | Toluene | ○ | ○ |
| Example 2-39 | Example 1-39 | Toluene | ○ | ○ |
| Example 2-40 | Example 1-40 | Toluene | ○ | ○ |
| Example 2-41 | Example 1-1 | IPA | ○ | ○ |
| Example 2-42 | Example 1-1 | 2-Ethyl-1-hexanol | ○ | ○ |
| Example 2-43 | Example 1-1 | α-Terpineol | ○ | ○ |
| Example 2-44 | Example 1-1 | Butyl carbitol | ○ | ○ |
| Example 2-45 | Example 1-1 | Butyl carbitol acetate | ○ | ○ |
| Example 2-46 | Example 1-41 | Toluene | ○ | ○ |
| Example 2-47 | Example 1-41 | IPA | ○ | ○ |
| Example 2-48 | Example 1-41 | 2-Ethyl-1-hexanol | ○ | ○ |
| Example 2-49 | Example 1-41 | α-Terpineol | ○ | ○ |
| Example 2-50 | Example 1-41 | Butyl carbitol | ○ | ○ |
| Example 2-51 | Example 1-41 | Butyl carbitol acetate | ○ | ○ |
| Example 2-52 | Example 1-42 | Toluene | ○ | ○ |
| Example 2-53 | Example 1-43 | Toluene | ○ | ○ |
| Example 2-54 | Example 1-44 | Toluene | ○ | ○ |

Comparative Examples 2-1 to 2-3

Using the silver nanoparticles and the solvent shown in Table 6, a dispersion liquid of the silver nanoparticles was prepared in the same way as in Example 2-1. The obtained dispersion liquid was evaluated in the same way as in Example 2-1. The results are shown in Table 6.

The results in Table 6 show that the stable time during storage was short in Comparative Example 2-2 without polymer (C). Thus it is assumed that polymer (C), even in a small amount, contributes to the dispersion stability of the silver nanoparticles.

TABLE 6

|  | Silver nanoparticles used | Solvent | Storage stability 5° C. | 25° C. |
|---|---|---|---|---|
| Comparative Example 2-1 | Comparative Example 1-1 | Toluene | Δ | ○ |
| Comparative Example 2-2 | Comparative Example 1-2 | Toluene | X | Δ |
| Comparative Example 2-3 | Comparative Example 1-3 | Toluene | ◎ | ○ |

Example 3-1

Production of Substrate Having Silver Film Formed Thereon and Evaluation of its Electrical Conductivity and Adhesivity The dispersion liquid of the silver nanoparticles prepared in Example 2-1 was printed on a polyethylene naphthalate film (abbreviated as PEN hereinbelow) by bar coating with Select-Roller (manufactured by OSG SYSTEM PRODUCTS CO., LTD.), and heat-treated at 150° C. for 30 minutes to obtain a substrate having a film in silvery white color having a film thickness of 1 μm formed thereon.

The electrical conductivity was evaluated by means of a four-point probe resistivity meter (LORESTA GP manufactured by MITSUBISHI CHEMICAL CORPORATION). The volume resistivity was found to be 5.5 Ω·cm, which represents excellent electrical conductivity.

The adhesivity was evaluated by forming 100 squares of 1 mm×1 mm each on the silver film with a cutter, adhering an adhesive tape (manufactured by 3M) on the film, peeling the tape, and counting the number of the squares left. The adhesivity was graded as ○ for 100/100, Δ for 99 to 50/100, and x for 49 to 0/100. The results are shown in Table 7.

Examples 3-2 to 3-54

Using the dispersion liquid of the silver nanoparticles shown in Table 7, a silver film was formed on a PEN in the same way as in Example 3-1, and the electrical conductivity and the adhesivity were evaluated. The results are shown in Table 7.

TABLE 7

|  | Dispersion liquid of silver nanoparticles used | Electrical conductivity (μΩ·cm) | Adhesivity |
|---|---|---|---|
| Example 3-1 | Example 2-1 | 5.5 | ○ |
| Example 3-2 | Example 2-2 | 5.8 | ○ |
| Example 3-3 | Example 2-3 | 6.2 | ○ |
| Example 3-4 | Example 2-4 | 5.4 | ○ |
| Example 3-5 | Example 2-5 | 8.0 | ○ |
| Example 3-6 | Example 2-6 | 5.5 | ○ |
| Example 3-7 | Example 2-7 | 6.7 | ○ |
| Example 3-8 | Example 2-8 | 5.5 | ○ |
| Example 3-9 | Example 2-9 | 6.7 | ○ |
| Example 3-10 | Example 2-10 | 7.0 | ○ |
| Example 3-11 | Example 2-11 | 4.2 | ○ |
| Example 3-12 | Example 2-12 | 6.8 | ○ |
| Example 3-13 | Example 2-13 | 4.8 | ○ |
| Example 3-14 | Example 2-14 | 5.5 | ○ |

TABLE 7-continued

|  | Dispersion liquid of silver nanoparticles used | Electrical conductivity (μΩ·cm) | Adhesivity |
|---|---|---|---|
| Example 3-15 | Example 2-15 | 5.1 | ○ |
| Example 3-16 | Example 2-16 | 5.2 | ○ |
| Example 3-17 | Example 2-17 | 7.8 | ○ |
| Example 3-18 | Example 2-18 | 5.2 | ○ |
| Example 3-19 | Example 2-19 | 3.8 | ○ |
| Example 3-20 | Example 2-20 | 5.8 | ○ |
| Example 3-21 | Example 2-21 | 4.2 | ○ |
| Example 3-22 | Example 2-22 | 5.0 | ○ |
| Example 3-23 | Example 2-23 | 5.6 | ○ |
| Example 3-24 | Example 2-24 | 7.9 | ○ |
| Example 3-25 | Example 2-25 | 9.2 | ○ |
| Example 3-26 | Example 2-26 | 7.5 | ○ |
| Example 3-27 | Example 2-27 | 8.8 | ○ |
| Example 3-28 | Example 2-28 | 8.3 | ○ |
| Example 3-29 | Example 2-29 | 9.2 | ○ |
| Example 3-30 | Example 2-30 | 7.4 | ○ |
| Example 3-31 | Example 2-31 | 8.5 | ○ |
| Example 3-32 | Example 2-32 | 7.8 | ○ |
| Example 3-33 | Example 2-33 | 9.2 | ○ |
| Example 3-34 | Example 2-34 | 6.5 | ○ |
| Example 3-35 | Example 2-35 | 9.2 | ○ |
| Example 3-36 | Example 2-36 | 9.7 | ○ |
| Example 3-37 | Example 2-37 | 9.5 | ○ |
| Example 3-38 | Example 2-38 | 5.6 | ○ |
| Example 3-39 | Example 2-39 | 5.2 | ○ |
| Example 3-40 | Example 2-40 | 5.4 | ○ |
| Example 3-41 | Example 2-41 | 5.5 | ○ |
| Example 3-42 | Example 2-42 | 6.0 | ○ |
| Example 3-43 | Example 2-43 | 8.9 | ○ |
| Example 3-44 | Example 2-44 | 9.5 | ○ |
| Example 3-45 | Example 2-45 | 9.0 | ○ |
| Example 3-46 | Example 2-46 | 5.4 | ○ |
| Example 3-47 | Example 2-47 | 6.0 | ○ |
| Example 3-48 | Example 2-48 | 5.9 | ○ |
| Example 3-49 | Example 2-49 | 9.2 | ○ |
| Example 3-50 | Example 2-50 | 9.0 | ○ |
| Example 3-51 | Example 2-51 | 9.0 | ○ |
| Example 3-52 | Example 2-52 | 5.4 | ○ |
| Example 3-53 | Example 2-53 | 5.3 | ○ |
| Example 3-54 | Example 2-54 | 5.3 | ○ |

Comparative Examples 3-1 to 3-3

Using the dispersion liquid of the silver nanoparticles shown in Table 8, a silver film was formed on a PEN in the same way as in Example 3-1, and the electrical conductivity and the adhesivity were evaluated. The results are shown in Table 8.

The results in Table 8 show that the electrical conductivity was poor and the resistance value could not be measured in Comparative Example 3-1. It is assumed to be because, as silver laurate was used as a silver compound in the preparation of the silver nanoparticles, residual silver laurate, lauric acid, or a silver laurate-amine complex remained in the silver film as a nonvolatile component.

In Comparative Example 3-2, the silver film had a poor adhesivity and was easily flaked off. It is assumed that the adhesivity to the PEN substrate could not be ensured due to the absence of a polymer component in the preparation of the silver nanoparticles. This leads to the assumption that the polymers (C) of Examples are desorbed from the surfaces of the silver nanoparticles and are adsorbed between the nanoparticles and the substrate surface during the heating process, which improves the adhesivity of the silver film to the substrate.

In Comparative Example 3-3, the resistance value was two digits higher. It is assumed to be because too much polymer component was added to cause tangling of the molecular chains, which prevented the silver nanoparticles from leaving the substrate surface to remain in the silver film.

TABLE 8

|  | Dispersion liquid of silver nanoparticles used | Electrical conductivity (μΩ · cm) | Adhesivity |
|---|---|---|---|
| Comparative Example 3-1 | Comparative Example 2-1 | O.L. | ○ |
| Comparative Example 3-2 | Comparative Example 2-2 | 5.7 | X |
| Comparative Example 3-3 | Comparative Example 2-3 | 357.2 | ○ |

What is claimed is:

1. A method for preparing silver nanoparticles comprising reduction treatment of a silver-containing composition comprising:

silver compound (A) represented by formula (1):

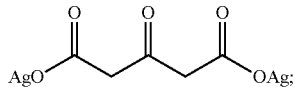

(1)

amine compound (B) having a primary amino group; and polymer (C) obtained by polymerization of a monomer composition comprising diol (meth)acrylate compound (c1) having a urethane bond represented by formula (2):

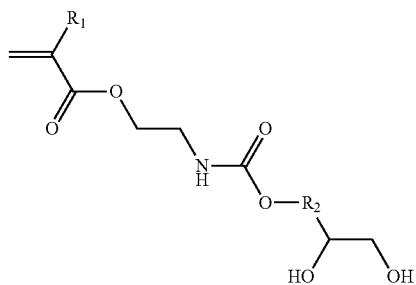

(2)

wherein $R_1$ is a hydrogen atom or a methyl group, $R_2$ is —$(CH_2)_n$—, and n is an integer of 1 to 4, and at least one monomer (c2) selected from (meth)acrylate monomers, acrylamide monomers, vinyl monomers, vinyl ether monomers, or monomers having an epoxy group;

wherein a content of said amine compound (B) is 1 to 50 mole equivalent of silver elements in said silver compound (A), and a content of said polymer (C) is 0.1 to 0.9 parts by mass with respect to 100 parts by mass of silver elements in said silver compound (A).

2. The method for preparing silver nanoparticles according to claim 1, wherein said reduction treatment is treatment with a reducing agent.

3. The method for preparing silver nanoparticles according to claim 1, wherein said reduction treatment is heat treatment.

4. Silver nanoparticles prepared by the method of claim 1.

5. A dispersion liquid of silver nanoparticles comprising the silver nanoparticles of claim 4 and a solvent.

6. A substrate having a silver element formed thereon by applying the dispersion liquid of claim 5 on a substrate, followed by heating.

* * * * *